United States Patent [19]

Sugiyama et al.

[11] Patent Number: 4,720,826
[45] Date of Patent: Jan. 19, 1988

[54] VENTILATION ARRANGEMENT FOR USE IN AN OPTICAL RECORDING DISC

[75] Inventors: Toshinori Sugiyama, Tsukuba; Mitsuru Shimizu, Torite, both of Japan

[73] Assignee: Hitachi Maxell, Ltd., Osaka, Japan

[21] Appl. No.: 840,863

[22] Filed: Mar. 18, 1986

[30] Foreign Application Priority Data

Mar. 20, 1985 [JP] Japan .................................. 60-54135
Nov. 19, 1985 [JP] Japan ................................ 60-257856

[51] Int. Cl.$^4$ ............................................... G11B 7/24
[52] U.S. Cl. ...................................... 369/283; 369/286
[58] Field of Search ................ 369/284, 286, 283, 285

[56] References Cited

U.S. PATENT DOCUMENTS 4,504,842 3/1985 Odaward ............................. 369/284
4,564,932 1/1986 Lange .................................. 369/284

Primary Examiner—Steven L. Stephan
Attorney, Agent, or Firm—Birch, Stewart, Kolasch & Birch

[57] ABSTRACT

An optical recording disc comprising two disc substrates, each in a cylindrical shape having a round center hole, at least one recording layer formed on the surface of at least one said disc substrate, and at least one bonding material layer is formed at an inner rim portion and an outer rim portion of the surface of the said disc substrate, on the surface of which the recording layer is formed, except for at least one portion of the said rim portion of the surface of the disc substrate, wherein the bonding material layer is provided to bond the said two disc substrates togehter, so that the surfaces of the said disc substrates, on the surface of which the recording layer is formed, face each other, thereby a space gap is formed between the said disc substrates, and the said one portion of the said rim portion of the surface of the disc substrate, where the bonding material layer is not formed, can act as a ventilation path, through which the air can pass from the said air gap into the outside of the optical recording disc, and reversely. Accordingly, the said ventilation path enables to prevent the shape of the disc substrate from changing and also enables to prevent the disc substrate from breaking, even if there is a pressure difference between the inside air gap and the outside of the optical recording disc, thereby the optical recording disc can record information correctly on the recording layer.

33 Claims, 21 Drawing Figures

VENTILATION ARRANGEMENT FOR USE IN AN OPTICAL RECORDING DISC

BACKGROUND OF THE INVENTION

1. Field of the Invention

The present invention relates to a ventilation type optical recording disc, more particularly, to a ventilation type optical recording disc comprising one or more ventilation paths, through which are outside of the optical recording disc passes into the inside air gap of the optical recording disc.

2. Description of the Prior Art

In general, an optical recording disc has a well known sandwich construction, that is, in the optical recording disc, a pair of disc substrates are bonded together through an inner spacer and an outer spacer, so that each of recording layers of a pair of the disc substrates, which is formed on the surface of the disc substrate, faces together. In the optical recording disc, a space, which is called "the air gap" below, is formed between the recording layers of both of the disc substrates, wherein the air gap is isolated from the outside of the optical recording disc.

The optical recording disc comprising the isolated air gap can prevent an alien substance such as dust etc. from adhering to the recording layer of the disc substrate, because the substance can not enter the air gap, thereby information can be recorded correctly on the recording layer. However, in the aforementioned optical recording disc, if the environment condition of the optical recording disc such as the temperature or the atmospheric pressure changes, there will be a pressure difference between the air gap and the outside of the optical recording disc, and it will be difficult to track and focus on a predetermined tracking line of the recording layer. Moreover, the disc substrate may be broken when the shape of the disc substrate changes.

In order to prevent the disc substrate from breaking and to prevent the shape of the disc substrate from changing, as shown in FIGS. 1 and 2, an optical recording disc comprising a ventilation path was proposed in the Japanese patent provisional publications Nos. 106204/1979 and 171049/1984, wherein the ventilation path was provided to make the air pass through between the inside air gap and outside of the optical recording disc.

In the proposed optical recording disc, an air gap is formed between a pair of recording layers 21a and 22a formed on the surfaces of disc substrates 21 and 22, a ventilation path 26 is formed between the surface of the disc substrate 21 and the surface of an inner spacer 24 in an annular shape, and a ventilation path 27 is formed between the surface of the disc substrate 21 and the surface of an outer spacer 25 in an annular shape. A space is formed so that the space extends from the air gap through the ventilation paths 26 and 27 to the outside of the optical recording disc. There are provided filters 28, for preventing an alien substrance such as dust etc. from entering the air gap, at the position where the ventilation paths 26 and 27 are formed and on the outer wall surface of the inner spacer 24 and the inner wall surface of the outer spacer 25. There will not be a pressure difference between the inside air gap and the outside of the optical recording disc, even if the environment condition around the optical recording disc such as the temperature or the atmospheric pressure etc. changes, because the air in the inside air gap can pass through the ventilation paths 26 and 27 into the outside of the optical recording disc and reversely. This optical recording disc can overcome the aforementioned problems when the environment condition changes, and can prevent the alien substance such as dust etc. from entering the inside air gap and information can be recorded correctly on the recording layers 21a and 22a, because the alien substance is filtered.

However, the conventional ventilation type optical recording disc comprising the filters 28 has the disadvantage of having additional assembling members and having additional process steps in its manufacture than a ventilation type of optical recording disc does not comprise filter 28. Also this disc has the disadvantage that it is difficult to deal with the very small filters 28. Therefore, the optical recording disc comprising the filters 28 increases the cost of making the optical recording disc. Moreover, the filters 28 and alien easily removed from the wall surface of the inner and outer spacers 24 and 25 by a centrifugal force when rotating the optical recording disc and a strong air flow, when a large pressure difference or a large temperature difference between inside air gap 23 and outside of the optical recording disc occurs, thereby recording layers 21a and 22a could easily be damaged by the removal of filters 28 and substances such as dust etc. could entered from the outside of the optical recording disc through venitlation paths 26 and 27 into the inside air gap.

SUMMARY OF THE INVENTION

An essential object of the present invention is to provide an optical recording disc which can overcome the aforementioned problems, that is, to provide an optical recording disc which is able to record information correctly on a recording layer formed on the surface of the disc substrate, wherein alien substances such as dust etc. cannot enter the inside air gap of the optical recording disc, the substance cannot adhere to the recording layer, the shape of the optical recording disc cannot be changed and the optical recording disc cannot be broken, even if the environment condition such as the temperature or the atmospheric pressure changes.

According to the aspect to the present invention, an optical recording disc comprising two disc substrates, each in a cylindrical shape having a round center hole, wherein at least one recording layer is formed on the surface of at least one said disc substrate, and at least one bonding material layer is formed at an inner rim portion and/or an outer rim portion of the surface of said disc substrate, on the suface of which the recording layer is formed, except for at least one portion of the said rim portion of the surface of the disc substrate, wherein the bonding material layer is provided to bond the said two disc substrates together, so that the surfaces of the said disc substrates, on the surface of which the recording layer is formed, faces each other, thereby forming a space gap between the said disc substrates and the said one portion of the said rim portion of the surface of the disc substrate. The portion where the bonding material layer is not formed, can act as a ventilation path, through which the air can pass from the said air gap into the outside of the optical recording disc, and reversely.

In the optical recording disc according to the present invention, the said ventilation path is able to prevent the shape of the disc substrate from changing and is able to prevent the disc substrate from breaking, even if there is a pressure difference between the inside air gap and the outside of the optical recording disc. The optical recording disc according to the present invention comprises a filtering function, however, does not comprise any filter member. Therefore, there is no filter member to be removed, to cause damage to the recording layer of the disc substrate.

Moreover, the optical recording disc according to the present invention has the advantage of having less assembling members and less process steps in its manufacture of the optical recording disc than a conventional ventilation type optical recording disc comprising the filter member, thereby decreasing the cast of manufacturing the optical recording disc according to the present invention as compared with that of said conventional ventilation type optical recording disc.

DETAILED DESCRIPTION OF THE PREFERRED EMBODIMENTS

Figure 1:
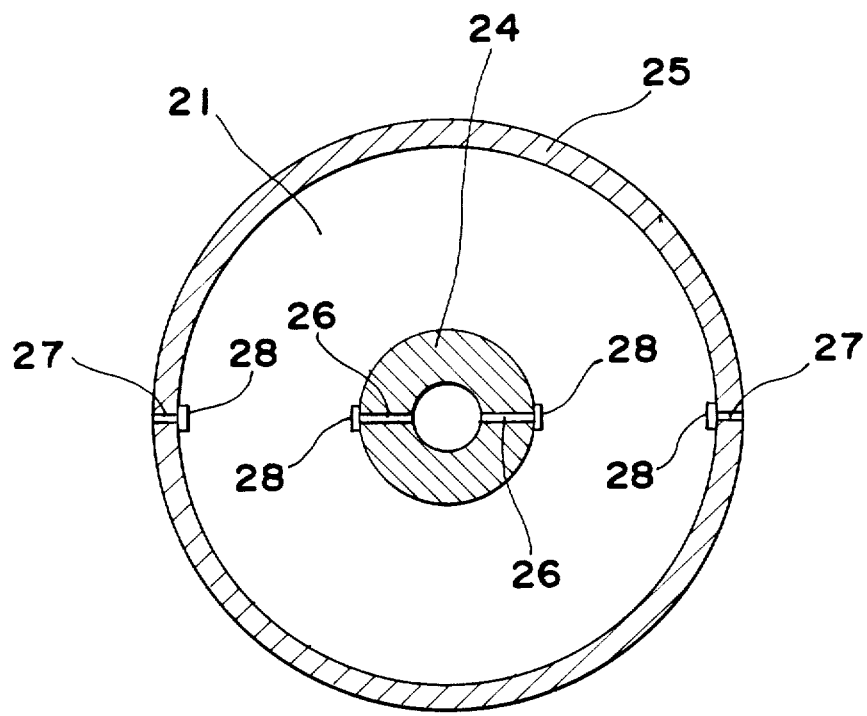
FIG. 1 is a plane view of an inner spacer and an outer spacer of a conventional ventilation type optical recording disc.
Figure 2:
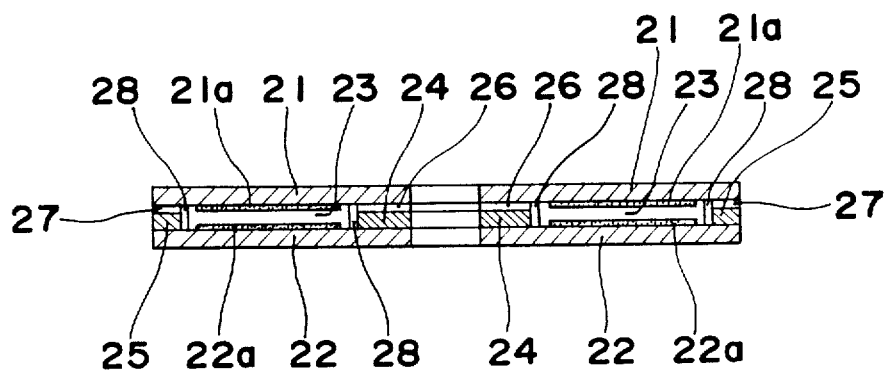
FIG. 2 is a longitudinal sectional view of the conventional type of optical recording disc comprising the inner spacer and the outer spacer shown in FIG. 1.
Figure 3:
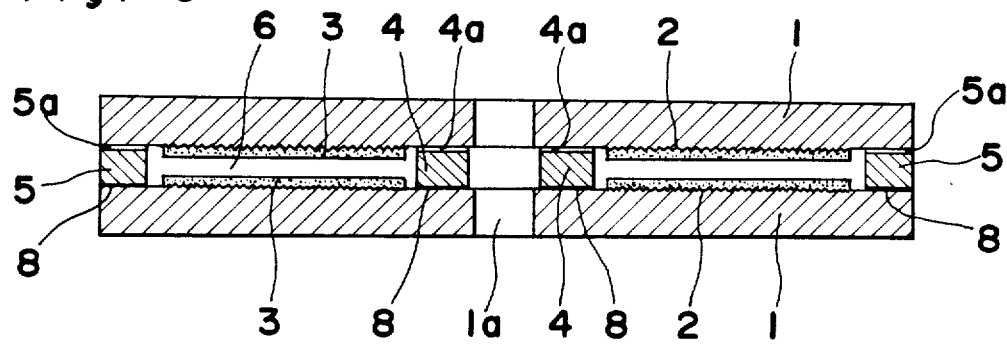
FIG. 3 is a longitudinal sectional view of a first preferred embodiment of an optical recording disc according to the present invention.

FIG. 3 shows a first preferred embodiment of a ventilation type optical recording disc according to the present invention. In FIG. 3, there is provided a pair of disc substrates 1 in an annular disc shape, in the center of which a round center hole 1a is formed. The respective disc substrate 1 is made of an inorganic material such as glass etc., or a plastic material such as polymethyl methacrylate, polycarbonate, polymethyl pentane, epoxy resin etc.. An uneven pattern 2 is formed on the one side surface of the disc substrate 1 by a known forming process such as the photopolymerization process, the injection process, the compression process, the injection-compression process etc.

A recording layer 3 is formed on the one side surface of the disc substrate 1, where the uneven pattern 2 is formed, by known film forming processes such as the spattering process, the vacuum evaporation process, the ion plating process, the plasma evaporation process, the nonelectrolysis plating process, etc. The recording layer 3 is made of a recording material which is suitable for recording information thereon, such as recording materials used for a heat mode, or an optical thermal magnetic recording material, etc.

An inner spacer 4 and an outer spacer 5 are formed in an annular shape having a predetermined inner diameter and a predetermined outer diameter by an injection forming process, a cutting process, or a punching process etc. In the injection process, the spacers 4 and 5 are made by forming a synthetic resin material made of polycarbonate resin, acrylic resin, polymethyl pentane resin, epoxy resin, vinyl chloride resin, or nylon resin etc. On the other hand, in the cutting process or the punching process, spacers 4 and 5 are made by forming a material in a disc shape, made of the aforementioned synthetic resin. Both surfaces of spacers 4 and 5 are flat, and the one side surface of the inner spacer 4 and the outer spacer 5 is coated with bonding material 8 except for several portions 4a and 5a of the surface, respectively, as shown in FIG. 4.

As shown in FIG. 3, in the optical recording disc, a pair of disc substrates 1 are bonded together through inner spacer 4 and outer spacer 5, so that each of recording layers 3 of a pair of the disc substrates 1 faces together. In the optical recording disc, inside air gap 6 is formed between recording layers 3 of both of the disc substrates 1, wherein the inside air gap is isolated from the outside of the optical recording disc.

Figure 4:
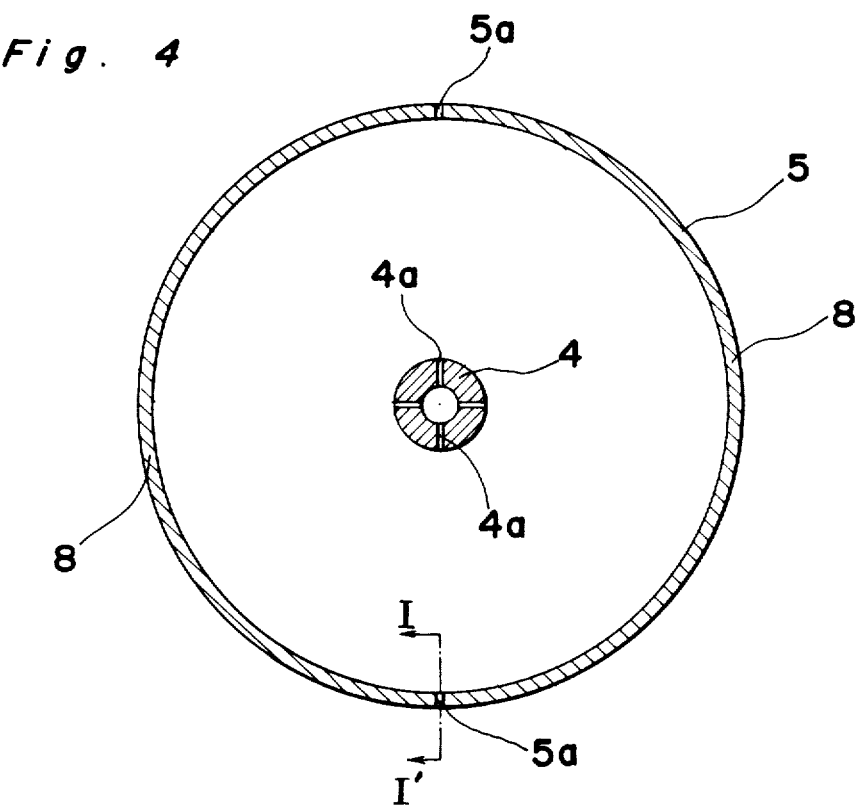
FIG. 4 is a plane view of an inner spacer and an outer spacer of the optical recording disc shown in FIG. 3.
Figure 5:
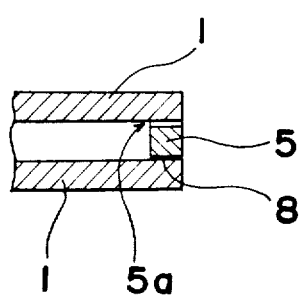
FIG. 5 is a partial longitudinal sectional view of the outer spacer on line of I—I' shown in FIG. 4.

FIG. 5 is a partial longitudinal sectional view of outer spacer 5 on line of I—I' shown in FIG. 4. As shown in FIG. 5, the several portions 5a of the surface of outer spacer 5, where bonding material 8 is not coated, are formed so that the respective portion 5a extends from the inner rim portion to the outer rim portion of outer spacer 5, thereby the aforementioned several portions 5a provide several ventilation paths 5a, so that the air in inside air gap 6 between both of the disc substrates 1 can pass through the ventilation paths 5a and reversely.

Figure 6:
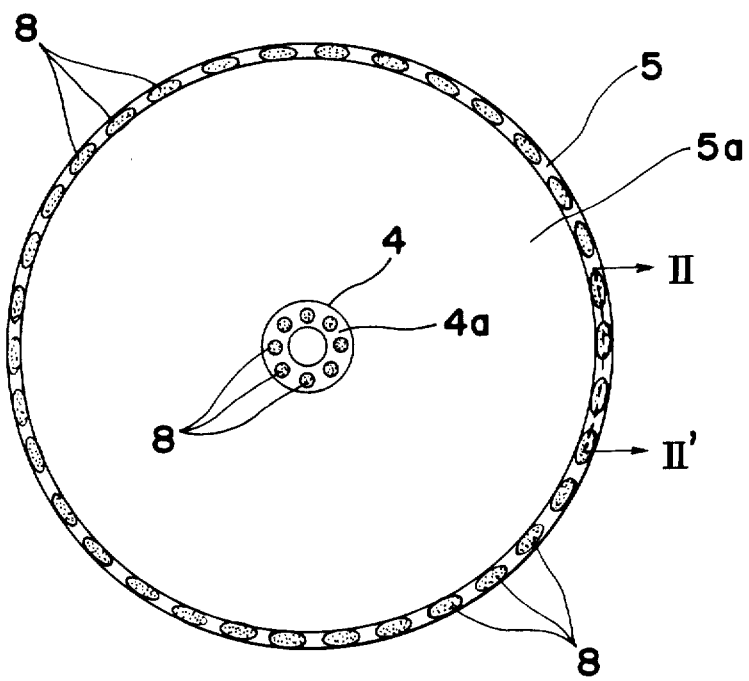
FIG. 6 is a plane view of an inner spacer and an outer spacer of a second preferred embodiment of an optical recording disc according to the present invention.

FIG. 6 shows a second preferred embodiment of inner spacer 4 and outer spacer 5 of the optical recording disc according to the present invention. In FIG. 6, the bonding material 8 may be coated on one side of inner spacer 4 and outer spacer 5 with a pattern comprising a number of elliptical shapes, at a predetermined interval between the elliptical shapes. Thereby, portions 4a and 5a of the surface of spacers 4 and 5, where bonding material 8 is not coated, are formed on the one surface of each of spacers 4 and 5, and the portions 4a and 5a of the surface of the spacers 4 and 5 provide a large amount of ventilation paths 4a and 5a. Therefore, the quantity of ventilation the optical recording disc shown in FIG. 6 is more than the quantity of ventilation of the optical recording disc shown in FIG. 3, and the use of optical recording disc shown in FIG. 6 can be for a practical use, although the quantity of ventilation per ventilation path 4a or 5a shown in FIG. 6 is less than the ventilation quantity ventilation per path 4a or 5a shown in FIG. 3.

Figure 7:
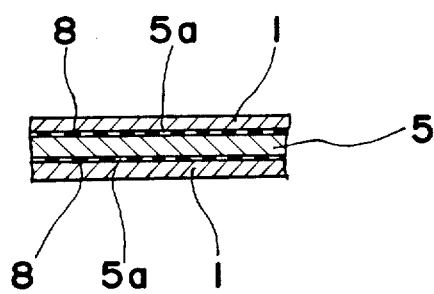
FIG. 7 is a partial longitudinal sectional view of the optical recording disc on line of II—II' shown in FIG. 6.

FIG. 7 is a partial longitudinal sectional view of outer spacer 5 on line of II—II' shown in FIG. 6. In FIG. 7, the optical recording disc comprises a large amount of ventilation paths 5a is formed between several pieces of bonding material 8, which are coated between disc substrate 1 and outer spacer 5, wherein ventilation paths 5a are formed at a predetermined interval. Thereby, the air in the inside of air gap 6 and the air in the outside of the optical recording disc can pass through ventilation paths 5a.

The ventilation paths 4a and 5a are preferably so formed that the greater number of ventilation paths 4a and 5a there are, the less the width of ventilation paths of 4a and 5a would be. The width of the ventilation paths 4a and 5a preferably is approximately 5 mm, more particularly in the range of about 3-15 mm. The thickness of the ventilation paths 4a and 5a preferably is similar to the thickness of the bonding material 8, for example, in the range of 0.5-20 $\mu$m. Moreover, the thickness of the ventilation paths 4a and 5a is preferably in the range of 0.5-5 $\mu$m in order to prevent an alien substance such as dust etc. from entering the inside of air gap 6, which is formed along both of the disc substrates 1, inner spacer 4 and outer spacer 5 in the inside portion of the optical recording disc.

The bonding material 8 may be coated on the surface of spacers 4 and 5 by a person's hand, on the other hand, a mechanical process such as a screen printing process etc. may be used to coat bonding material 8 uniformly and fast on the surface of spacers 4 and 5 with the aforementioned pattern comprising a number of elliptical shapes. Either epoxy resin or ultravioletray hardening resin may be used as bonding material 8.

Figure 8:
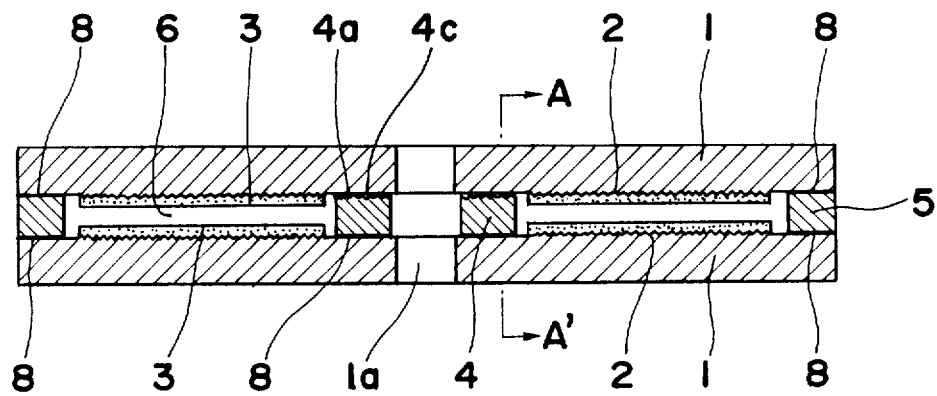
FIG. 8 is a longitudinal sectional view of a third preferred embodiment of an optical recording disc according to the present invention.
Figure 9:
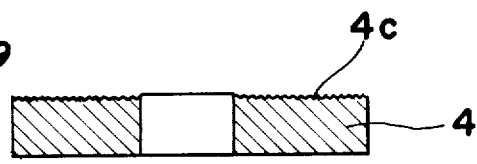
FIG. 9 is a partial longitudinal sectional view of the inner spacer shown in FIG. 8.

FIG. 8 shows a third preferred embodiment of the optical recording disc according to the present invention, and FIG. 9 is a longitudinal sectional view of the optical recording disc on line of A—A' shown in FIG. 8. In FIG. 8, the optical recording disc comprises an inner spacer 4 and an outer spacer 5 in an annular shape having a predetermined inner diameter and a predetermined outer diameter, wherein rough surface 4c is formed on one side surface of inner spacer 4 as shown in FIG. 9, with a predetermined roughness taken account into an air conductance, a dust prevention and a process precision to be required. If the interval between the top points of the rough surface 4c corresponding to the roughness of the rough surface 4c is less than 0.5 $\mu$m, the speed of the ventilation air passing through the ventilation path 4a is less than $2 \times 10^{-10}$ m$^3$/sec and it is difficult to form a uniform rough surface 4c with said roughness. On the other hand, if the interval between the top points of rough surface 4c is more than 3 $\mu$m, the dust whose length is more than 3 $\mu$m can pass through ventilation path 4a and can adhere to recording layer 3, thereby it become difficult to record information correctly on recording layer 3. Accordingly, the interval between the top points of rough surface 4c corresponding to the roughness of rough surface 4c is preferably in the range of 0.5-3 $\mu$m.

Inside air gap 6 may be formed between both of disc substrates 1 with interval members such as inner spacer 4 and outer spacer 5, wherein the top and bottom surfaces of the spacers 4 and 5 are coated with bonding material 8.

Figure 10:
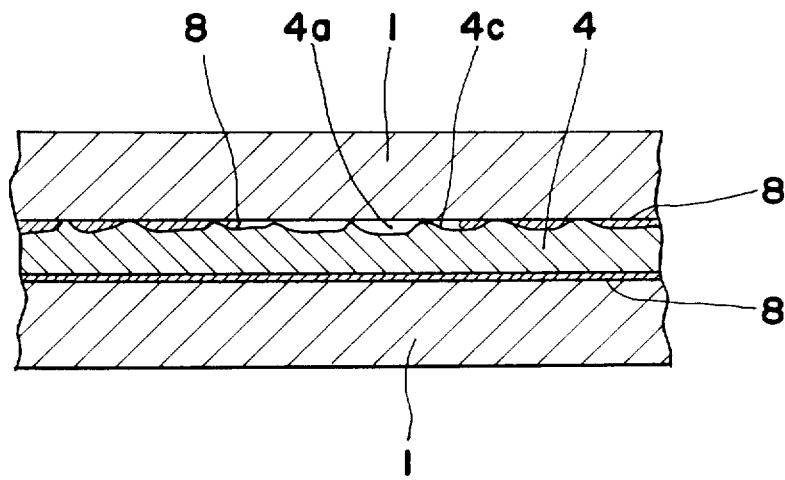
FIG. 10 is a partial expanded longitudinal sectional view of the ventilation paths shown in FIG. 8.

Ventilation paths 4a are formed between one side of disc substrate 1 and the rough surface 4c of inner spacer 4, where bonding material 8 is not coated, as shown in FIG. 10, thereby the outside air of the optical recording disc can pass through ventilation paths 4a into inside air gap 6 and reversely. In this case, the dust in the outside air of the optical recording disc is filtered by ventilation paths 4a and ventilation paths 4a can prevent the dust in the outside air of the optical recording disc from entering inside air gap 6, since the width of the respective ventilation path 4a is very small, such as approximately 0.5-3 $\mu$m. Therefore, it become possible to record information correctly on recording layer 3 of the optical recording disc.

Figure 11:
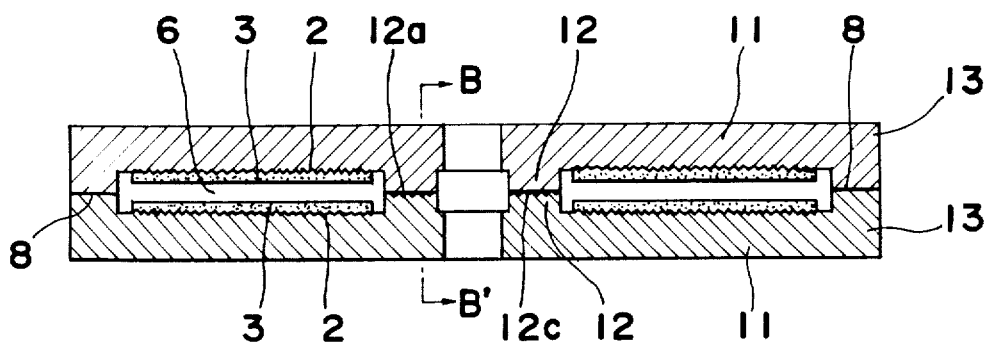
FIG. 11 is a longitudinal sectional view of a fourth preferred embodiment of an optical recording disc according to the present invention.
Figure 12:
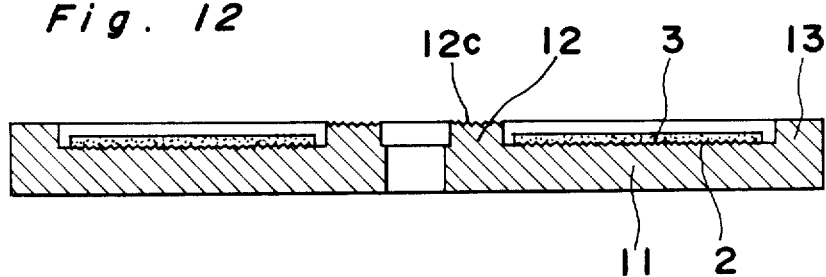
FIG. 12 is a longitudinal sectional view of one side of the optical recording disc shown in FIG. 11.

FIG. 11 shows a fourth preferred embodiment of the optical recording disc according to the present invention. A significant feature is to arrange a pair of disc substrates 11, each comprising two annular projected portions 12 and 13 at the inner rim portion and the outer rim portion of disc substrate 11. The inner annular projected portion 12 is formed as one portion of disc substrate 11 at the inner rim portion of disc substrate 11, and the outer annular projected portion 13 is formed as one portion of disc substrate 11. In FIG. 11, the same reference number is used as the reference number used in FIG. 8 when the member shown in FIG. 11 is similar to the member shown in FIG. 8, respectively. A rough surface 12c is formed on at least one side of the surface of inner projected portion 12 facing the surface of the inner projected portion 12 of another disc substrate 11. The interval between the top points of rough surface 12c corresponding to the roughness of rough surface 12c is around the same as the aforementioned interval shown in the third preferred embodiment of the optical recording disc of FIG. 8, which is in the range of approximately 0.5-3 $\mu$m.

Figure 13:
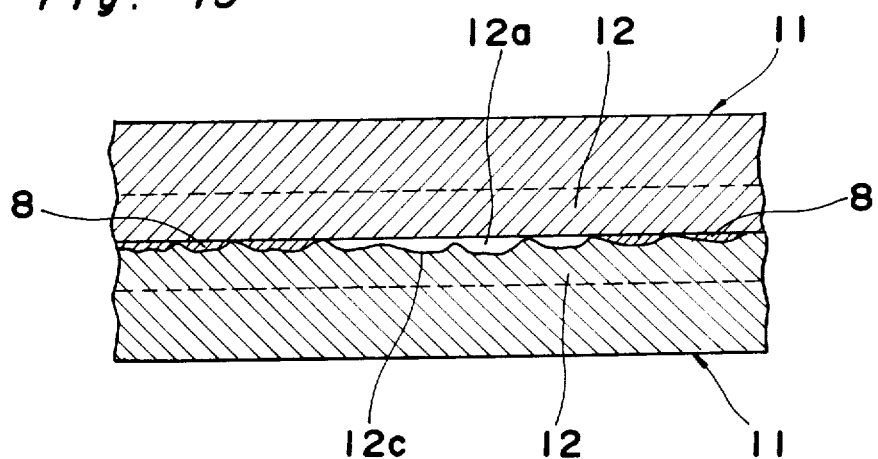
FIG. 13 is a partial longitudinal sectional view of the ventilation paths shown in FIG. 11.

The optical recording disc of the fourth preferred embodiment is made as one body by bonding a pair of disc substrates 11 without the spacers 4 and 5 shown in the first and second preferred embodiments of FIGS. 3 and 8, wherein the surfaces of inner and outer projected portions 12 and 13, facing the surfaces of another projected portions 12 and 13, are coated. Ventilation paths 12a are formed between both of the faced surfaces of the inner projected portion 12 of disc substrate 11 and at the portion where bonding material 8 is not coated, as shown in FIG. 13.

The fourth preferred embodiment of the optical recording disc has the same effect as the effect of the third preferred embodiment of the optical recording disc, and inner and outer spacers 4 and 5 used in the first, second and third preferred embodiment of the optical recording disc can be omitted, since the inner and outer projected portions 12 and 13 are formed at the inner and outer rim portions of both of the disc substrates 11. Thereby, the fourth preferred embodiment of the optical recording disc has the advantage of having members, of which the optical recording disc consists, and the less number of process steps in its manufacture than the first, second and third preferred embodiments.

A preferred embodiment of the manufacturing process of the first preferred embodiment of the optical recording disc will be described below. As shown in FIG. 13, bonding material 8 is coated in a belt shape at a predetermined quantity on a predetermined position of the bonding surface of inner spacer 4, rotating inner spacer 4, wherein bonding material 8 is supplied by dispenser 14. Then, bonding material 8 is coated, so that ventilation paths 4a are formed comprising a predetermined width between spacer 4 and disc substrate 1 when bonding material 8 is extended by pressing inner spacer 4 on the surface of disc substrate 1.

Next, bonding material 8 coated on the surface of inner spacer 4, is extended by pressing inner spacer 4 on the surface of disc substrate 1, so that one side surface of inner spacer 4, where the bonding material 8 is coated, faces the surface of disc substrate 1 where recording layer 3 is formed, thereby disc substrate 1 and inner spacer 4 are bonded as one body. Then, very small ventilation paths 4a, whose width is in the range of approximately 0.5-3 $\mu$m, are formed in the portion between the surface of disc substrate 1 and the surface of inner spacer 4 where bonding material 8 is not coated. Then, outer spacer 5, whose one side surface is coated with bonding material 8, is bonded on the outer rim portion of disc substrate 1. Finally, after another side surfaces of inner and outer spacers 4 and 5, facing the one side surface of another disc substrate 1, are coated with bonding material 8 by the aforementioned coating process, another disc substrate 1 is bonded on the opposite side to the side of inner and outer spacers 4 and 5 to which disc substrate 1 is bonded, thereby the process of manufacture of the first preferred embodiment of the optical recording disc is completed.

Figure 16:
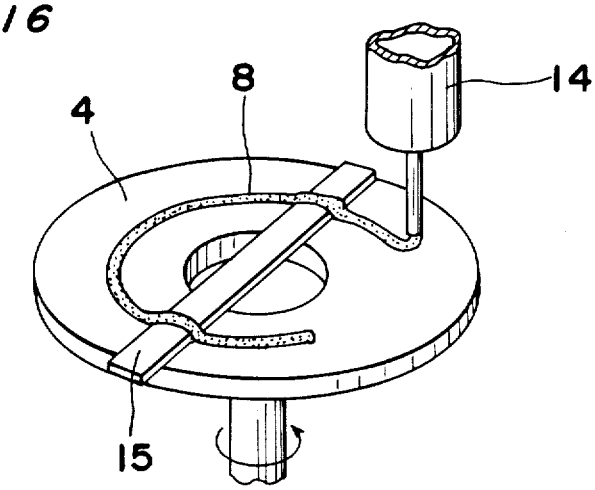
FIG. 16 is a perspective view of the inner spacer of the first, second, third and fourth preferred embodiments of the optical recording disc showing a second process for coating a bonding material on the surface of the inner spacer.

In the aforementioned process of manufacturing the optical recording disc, bonding material 8 is coated on one portion of rough surface 4c, controlling the quantity of bonding material 8 supplied by dispenser 14. However, the aspect of the present invention is to arrange the area where bonding material 8 has not coated, on the surface of inner spacer 4. Proceses coating bonding material 8 may be used other than the aforementioned process. For example, as shown in FIG. 16, a mask pattern layer 15 in the rectangular disc shape is arranged on rough surface 4c of inner spacer 4, wherein the length of mask pattern layer 15 is about the same as the outer diameter of inner spacer 4 and its width is about the same as the required width of ventilation path 4a. Then, after the bonding material 8 is coated on all around the surfaces of inner spacer 4 and mask pattern layer 15, mask pattern layer 15 is removed. As a result, the area where the bonding material 8 is not coated is formed on the surface of inner spacer 4. The process for coating bonding material 8 on the surface of inner spacer 4, shown in FIG. 16, can be applied to the process for coating on the surface of outer spacer 5, and the area where the bonding material 8 is not coated, can be formed on the surface of outer spacer 5 by the aforementioned process.

Figure 14:
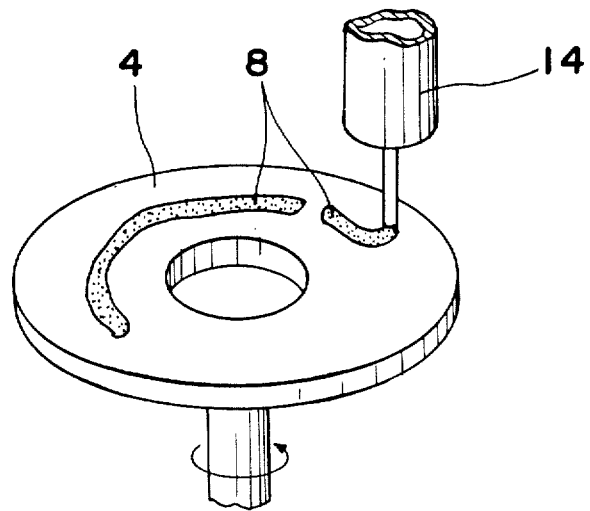
FIG. 14 is a perspective view of the inner spacer of the first, second, third and fourth preferred embodiments of the optical recording disc showing a first process for coating a bonding material on the surface of the inner spacer.
Figure 15:
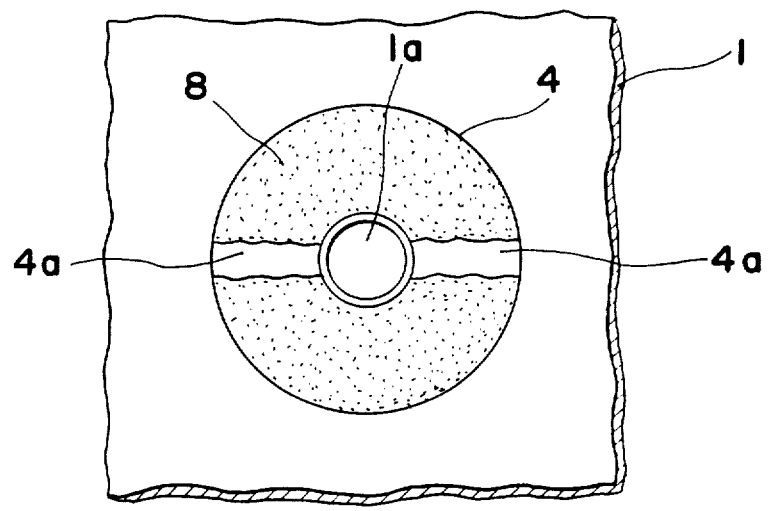
FIG. 15 is a plane view of the surface of the inner spacer where the bonding material is coated by the process shown in FIG. 14.

In the preferred emboidment shown in FIGS. 14 through 16, two ventilation paths 4a are formed on inner spacer 4, however, any number of ventilation paths 4a may be formed on the surface of inner spacer 4 by taking into account the air conductance to be required inside air gap 6.

In the preferred embodiment described above, bonding material 8 is used as bonding means, however, any other known bonding means may be used, such as the ultrasonic bonding process.

Figure 17:
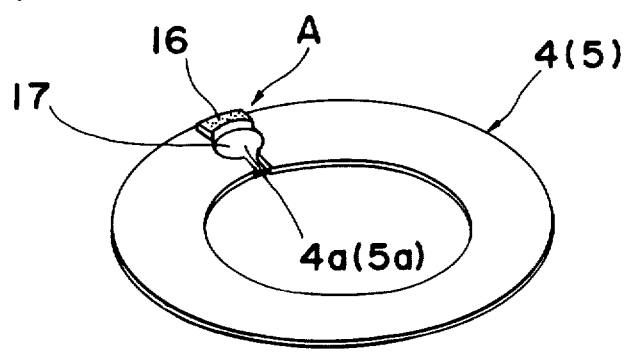
FIG. 17 is a perspective view of an inner spacer or an outer spacer comprising a projected portion.
Figure 18:
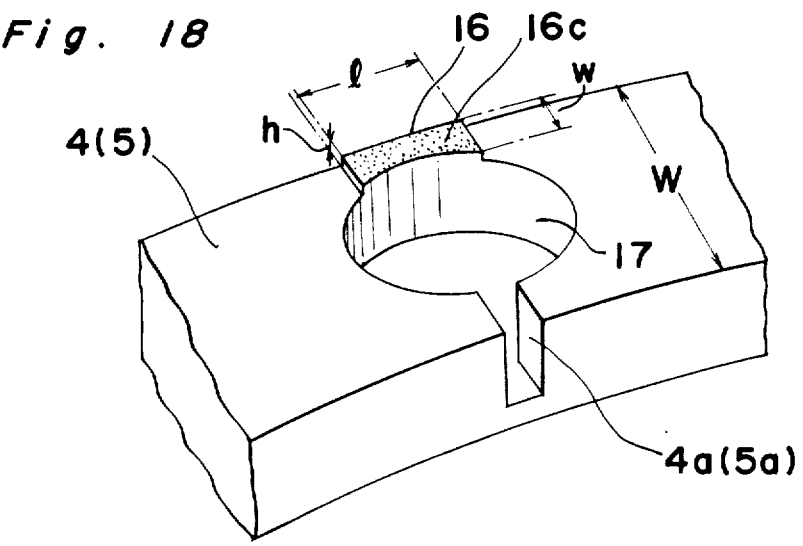
FIG. 18 is an expanded perspective view of the projected portion of the inner spacer or the outer spacer shown in FIG. 17, FIG. 19 a perspective view of the inner spacer or the outer spacer shown in FIGS. 17 and 18 showing a process for coating a bonding material on the surface of the inner spacer or the outer spacer.

FIG. 17 is a perspective view of a fifth preferred embodiment of a spacer of the optical recording disc according to the present invention, and FIG. 18 is an expanded partial perspective view of the A portion shown in FIG. 17. In FIGS. 17 and 18, there is provided a spacer 4 (5), which can be used as inner spacer 4 and outer spacer 5, having a predetermined inner diameter and a predetermined outer diameter. Spacer 4 (5), for example, is formed in an annular shape by the injection forming process, wherein spacer 4 (5) is made by forming a synthetic resin material such as polycarbonate resin, acrylic resin, epoxy resin, vinyl chloride resin, or nylon resin, etc.

Projected portion 16 for facing the surface of disc substrate 1 is formed projecting above the surface of spacer 4 (5) at the outer rim portion of the surface of spacer 4 (5), wherein the end portion of projected portion 16 is positioned at the outer surface of spacer 4 (5), and width w of projected portion 16 in the diameter direction of spacer 4 (5) is less than width W of spacer 4 (5), which is the outer diameter minus the inner diameter. Surface 16c of projected portion 16 is formed roughly. Height h and length l of projected portion 16, and the roughness of rough surface 16c of projected portion 16 can be determined taking into account the thickness of bonding material 8 when spacer 4 (5) is bonded on disc substrate 1, the air conductance, dust prevention and process precision, to be required. That is, when spacer 4 (5) is bonded to disc substrate 1 with bonding material 8 such as UV resin, epoxy resin and hotmelt etc., the bonding layer, whose thickness is approximately 5-20 $\mu$m, is generally formed. Therefore, projected portion 16 of spacer 4 (5), whose height is approximately 5-20 $\mu$m, is formed in order to bond spacer 4 (5) on disc substrate 1 so that the surface of spacer 4 (5) is parallel to the surface of the disc substrate 1.

If the interval between the top points of rough surface 16c of projected portion 16, corresponding to the roughness of rough surface 16c of projected portion 16, is less than 0.5 $\mu$m, the air conductance in ventilation path 4a (5a) is less than $2 \times 10^{-10}$ m$^3$/sec at an air pressure of 1 atm, then it becomes difficult for the outside air of the optical recording disc to pass through ventilation path 4a (5a) and entering into inside air gap 6 of the optical recording disc, and it becomes difficult to form rough surface 16c uniformly.

If the interval between the top points of rough surface 16c is more than 3 $\mu$m, the dust whose length is more than 3 $\mu$m, can enter into inside air gap 6 of the optical recording disc and could then adhere to recording layer 3 of the optical recording disc, and it may be difficult to record information correctly on recording layer 3 of the optical recording disc. Therefore, projected portion 16 of spacer 4 (5) is formed, so that the interval between the top points of rough surface 16c preferably is in the range of 0.5–3 μm, and length l of projected portion 16 in the circumferential direction is preferably in the range of 1–10 μm.

In FIGS. 17 and 18, ventilation path 4a (5a) is formed by cutting the inner rim portion of spacer 4a (5a), so that ventilation path 4a (5a) extends from bonding recess 17 to the inner surface of spacer 4a (5a).

Bonding recess 17 is formed in a cylindrical shape, whose diameter is more than the aforementioned length l of projected portion 16, at the center portion between the inner rim portion and the outer rim portion of surface of the spacer 4a (5a) and at the portion which is positioned a little nearer to projected portion 16 than said center portion. The bonding recess 17 is provided to drop down bonding material 8, which is coated at the portion where bonding recess 17 is formed, into bonding recess 17, when bonding material 8 is coated on the surface of spacer 4 (5) rotating spacer 4 (5). Bonding recess 17 is also provided to prevent rough surface 16c of projected portion 16 from being coated with bonding material 8, when bonding material 8 is expanded by pressing spacer 4 (5) on the surface of disc substrate 1 after being coated.

Figure 19:
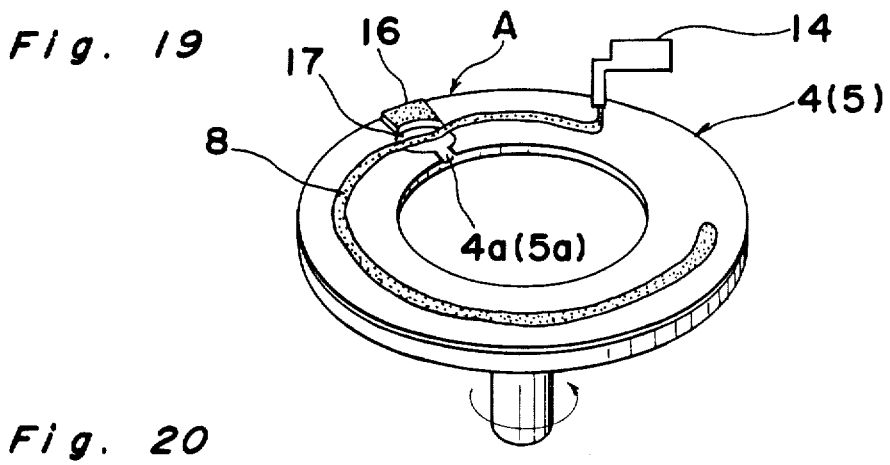
Figure 20:
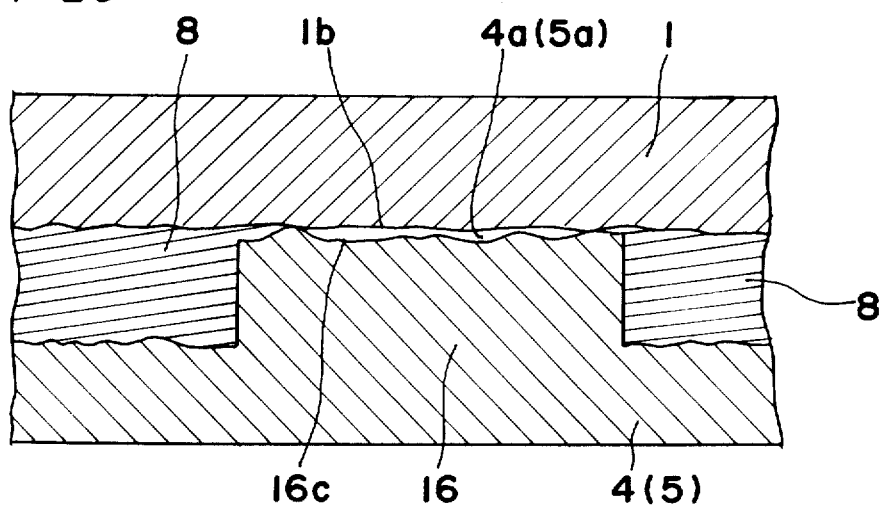
FIG. 20 is an expanded longitudinal sectional view of the optical recording disc comprising the inner spacer or the outer spacer having the projected portion coated with the bonding material by the process shown in FIG. 19.

Referring to FIGS. 19 and 20, the process for bonding spacer 4 (5) on the surface of disc substrate 1 will be described below in the case of using spacer 4 (5) as inner spacer 4.

First of all, as shown in FIG. 19, bonding material 8 is coated in a belt shape on the surface of inner 4 by being supplied continuously with a predetermiend quantity by dispenser 14, wherein there is provided bonding material 8 which is suitable to bond inner spacer 4 on the surface of disc substrate 1.

Next, as shown in FIG. 20, bonding material 8 is expanded by pressing the coated surface of inner spacer 4 on surface 1b of disc substrate 1 where recording layer 3 is formed, so that surface 1b faces rough surface 16c of projected portion 16 of spacer 4. Then, bonding material 8 can not be coated on rough surface 16c of projected portion 16, because bonding material 8, coated at the portion which is positioned a little nearer to the inner surface of spacer 4 than the inner rim portion of rough surface 16c of projected portion 16, is dropped down into bonding recess 17, and bonding material 8 can not be extended to rough surface 16c of projected surface 16 by pressing spacer 4 on the surface of disc substrate 1. As a result, very small ventilation paths 4a, whose width is in the range of approximately 0.5–3 μm corresponding to the interval between the top points of rough surface 16c of projected portion 16, are formed between surface 1b of disc substrate 1, where recording layer 3 is formed, and rough surface 16c of projected portion 16 of spacer 4.

According to our experiment, bonding material 8 is extended so that the thickness of bonding material 8 is 5–20 μm, and the geometric level of rough surface 16a of projected portion 16 becomes equal to about the level of the surface of bonding material 8. Therefore, an excessive interval between surface 1b of disc substrate 1 and rough surface 16c of projected portion 16 cannot be formed, and moreover, inner spacer 4 cannot be arranged on the condition that the inner spacer slants to disc substrate 12.

Then, outer spacer 5 in an annular shape is bonded on the outer rim portion of surface 1b of disc substrate 1, on surface 1b of which recording layer 3 is formed, wherein the outer spacer does not comprise a projected portion 16. Finally, another second disc substrate 1 is bonded on the opposite side surface to the side surface of inner and outer surface 4 and 5, where first disc substrate 1 is formed, so that recording layer 3 of first disc substrate 1 faces recording layer 3 of second disc substrate 1. Then, the process for manufacturing the optical recording disc is completed.

In the aforementioned fifth preferred embodiment of the optical recording disc, the outside air of the optical recording disc can pass through ventilation paths 4a and entering into inside air gap 6 of the optical recording disc, because ventilation paths 4a are formed between surface 1b of disc substrate 1 and rough surface 16c of projected portion 16 of inner spacer 4. In this case, ventilation paths 4a can prevent the dust in the outside air of the optical recording disc from entering inside air gap 6 of the optical recording disc, because the width of the respective ventilation path 4a, through which the outside air passes, is very small and in the range of approximately 0.5–3 μm, and the outside dust is filtered by ventilation path 4a.

In the aforementioned fifth preferred embodiment, projected portion 16 is formed only on the surface of inner spacer 4, however, projected portion 16 may be formed on the surface of outer spacer 5. Projected portion 16 may be formed on the surface of both of inner and outer spacers 4 and 5.

In the aforementioned fifth preferred embodiment, only one projected portion 16 is formed on the surface of inner spacer 4, however, any number of the projected portion 16 may be formed on the surface of inner spacer 4 or/and outer spacer 5. A plurality of the projected portion 16 can make the two disc substrates 1 and spacers 4 and 5 bond together more stably than when there is only one projected portion 16, and they can facilitate bonding the two disc substrates 1 and spacers 4 and 5 together.

Figure 21:
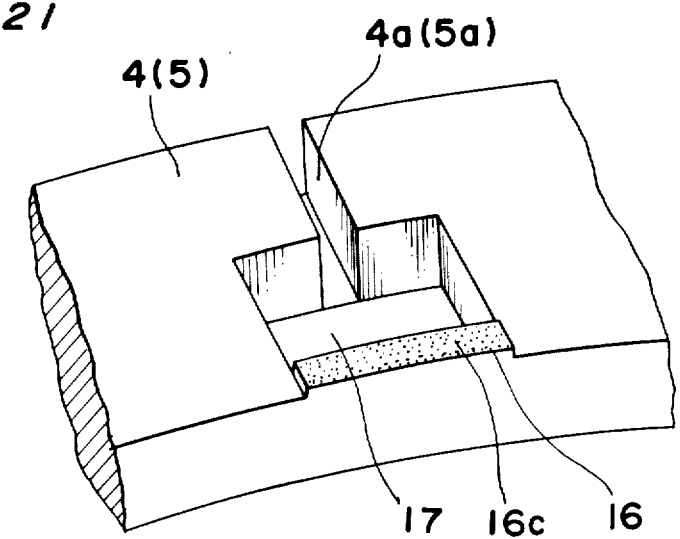
FIG. 21 is an expanded perspective view of another preferred embodiment of a projected portion of an inner spacer or an outer spacer.

In the aforementioned fifth preferred embodiment, projected portion 16 is formed on the outer rim portion of the surface of spacer 4 (5) and bonding recess 17 is formed in the cylindrical shape at the inside of projected portion 16, however, projected portion 16 may be formed on any position of the surface of spacer 4 (5) and bonding recess 17 may be formed in any shape, whose diameter or width is within the width of spacer 4 (5) corresponding to the outer diameter minus the inner diameter, and on any position of the surface of spacer 4 (5). For example, as shown in FIG. 21, projected portion 16 may be formed on the inner rim portion of the surface of spacer 4 (5), and ventilation path 4a (5a) may be formed so that ventilation path 4a (5a) extends from bonding recess 17 to the outer surface of spacer 4 (5). Bonding recess 17 may be formed in a rectangular shape on the surface of spacer 4 (5).

In the aforementioned fifth preferred embodiment, projected portion 16, ventilation path 4a (5a) and bonding recess 17 are formed on the surface of spacer 4 (5), however, projected portion 16, ventilation path 4a (5a) and bonding recess 17 may be formed on surface of disc substrate 1.

In the aforementioned fifth preferred embodiment, bonding recess 17 is formed at the nearer position on surface of the spacer 4 (5) to projected portion 16, however, and bonding recess 17 is provided to prevent bonding material 8 from being coated on the surface of spacer 4 (5) near the surface of projected portion 16. Bonding recess 17 may be omitted when the width of ventilation path 4a (5a) is large enough to make bonding material 8 drop down, that is, to prevent bonding material 8 from being coated on the aforementioned surface of spacer 4 (5) which is not to be coated.

In the aforementioned fifth preferred embodiment, disc substrate 1 is separate from inner and outer spacers 4 and 5, and spacers 4 and 5 are bonded on the surface of disc substrate 1, however, projected portions in an annular shape may be formed on the inner rim portion and the outer rim portion of the surface of the disc substrates 1, instead of inner spacer 4 and outer spacer 5.

What is claimed is:

1. An optical recording disc comprising
two disc substrates, each in a cyclindrical shape having a round center hole,
at least one recording layer is formed on the surface of at least one said disc substrate, and
at least one bonding material layer is formed at an inner rim portion and an outer rim portion of the surface of said disc substrate, on the surface of which the recording layer is formed, except for at least one portion of said inner rim portion or said inner and outer rim portion of the surface of the disc substrate where the bonding material is not formed, wherein the bonding material layer is provided to bond said two disc substrates together, so that the surfaces of said disc substrates, on the surface of at least one said disc substrate which at least one recording layer is formed, face each other, thereby forming a space gap between said disc substrates, and said one portion of said inner rim portion or said inner and outer rim portion of the surface of the disc substrate where the bonding material layer is not formed, said space gap acting as a ventilation path through which air can pass from an inside air gap of the optical recording disc, to the outside of the optical recording disc, and reversely.

2. The optical recording disc as defined in claim 1, wherein at least one air space is arranged in the bonding material layer formed between the inner rim portion and/or the outer rim portion of the surface of the disc substrate, thereby the said air space can act as the said ventilation path.

3. The optical recording disc as defined in claim 1, wherein each of the two disc substrates comprising an inner projected portion in a cyclindrical shape formed at the inner rim portion of the surface of each of the disc substrate, and an outer projected portion in a cylindrical shape formed at the outer rim portion of the surface of each of the disc substrate, wherein the surface of the inner projected portion and/or the outer projected portion of at least one said disc substrate is made of a rough surface, and the bonding material layer is formed on the said rough surface except for one portion of the rough surface, thereby one said portion of the rough surface, where the bonding material layer is not formed, can act as the said ventilation path.

4. The optical recording disc as defined in claim 1, wherein at least one projected portion for facing is formed on a portion of the inner rim portion and/or the outer rim portion of at least one side surface of each of the disc substrates, the bonding material layer is formed on the inner rim portion and/or the outer rim portion of the surface of the said disc substrate except the said portion where the projected portion for facing is formed, and the two disc substrates are bonded together, thereby the said projected portion for facing can act as the said ventilation path.

5. The optical recording disc as defined in claim 4, wherein the surface of said projected portion for facing is made a rough surface, and a through path is formed so that the through path is extended from the end portion of the projected portion for facing to the inner or outer surface of the said disc substrate, thereby the through path can act as the said ventilation path.

6. The optical recording disc as defined in claim 1, in which the two disc substrates comprise at least one spacer member bonded therebetween.

7. The optical recording disc as defined in claim 6, wherein at least one surface of the disc substrate or at least one surface layer of the spacer member, on which the bonding layer is formed, is made of a rough surface.

8. The optical recording disc as defined in claim 7, wherein said cylindrical shape is a cylindrical spacer having a round center hole, at least one rough surface and a predetermined inner diameter and a predetermined outer diameter.

9. The optical recording disc as defined in claim 7, wherein the interval between the top points of the rough surface is in the range of 0.5-3 μm.

10. The topical recording disc as defined in claim 8, wherein the interval between the top points of the said surface, corresponding to the roughness of the rough surface, is in the range of 0.5-3 μm.

11. The optical recording disc as defined in claim 8, wherein at least one projected portion for facing is formed on the surface of at least one spacer, the bonding material layer is formed on the surface of at least one spacer, except the said portion where the projected portion for facing is formed, and the two disc substrates are bonded together, thereby the said projected portion for facing can act as the said ventilation path.

12. The optical recording disc as defined in claim 11, wherein the surface of said projected portion for facing is made a rough surface, and a through path is formed so that the through path is extended from the end portion of the projected portion for facing to the inner or outer surface of the said spacer, thereby the through path can act as the said ventilation path.

13. The optical recording disc as defined in claim 3, wherein the interval between the top points of the said surface, corresponding to the roughness of the rough surface, is in the range of 0.5-3 μm.

14. The optical recording disc as defined in claim 1, wherein at least one surface of the disc substrate on which the bonding layer is formed, is made of a rough surface.

15. The optical recording disc as defined in claim 14, wherein the interval between the top points of the rough surface is in the range of 0.5-3 μm.

16. An optical recording disc comprising
two disc substrates, each in a cylindrical shape having a round centre hole, and connected by spacer means to separately oppose each other through an air gap,
at least one recording layer formed on the surface of at least one of said two disc substrates, at least one bonding material layer made of a substantially different material from the material of said disc substrates for bonding said two disc substrate, said bonding material layer acting said spacer means and being formed on at least one portion of an inner rim portion and an outer rim portion of the surface of said disc substrates where said recording layer is formed, and at least one through hole defined in said bonding material layer to provide a ventilation path for allowing to pass air between the air gap and outside of the optical recording disc.

17. The optical recording disc as defined in claim 16, wherein the surface of said substrate bonded to said bonding material layer is made with a rough surface.

18. The optical recording disc as defined in claim 16, further comprising at least one annular spacer mounted on either the inner rim portion or the outer rim portion of the surface of said disc substrate with a rough surface formed on said annular spacer, said bonding material layer being formed on the rough surface of said annular spacer.

19. The optical recording disc as defined in claim 16, wherein said respective disc substrate comprising an inner projected portion in a cylindrical shape formed at the inner rim portion of the surface of said disc substrate, an outer projected portion in a cylindrical shape formed at the outer rim portion of the surface of said disc substrate, the surface of the inner projected portion and the outer projected portion of at least one said disc substrate are made a rough surface, and said bonding material layer is formed on said rough surface.

20. The optical recording disc as defined any one of claims 17 to 19, wherein the interval between the top points of said rough surface, corresponding to the roughness of the rough surface, is in the range of 0.5–3 $\mu$m.

21. The optical recording disc as defined in claim 16, wherein at least one projected portion for facing said disc substrate is formed on at least one portion of the inner rim portion and the outer rim portion of at least one side surface of said disc substrate, said bonding material layer is formed on at least one portion of the inner rim portion and the outer rim portion of the surface of said disc substrate except said portion where the projected portion for facing said disc substrate is formed, said two disc substrates are bonded together, and said projected portion for facing said disc substrate can act as said ventilation path.

22. The optical recording disc as defined in claim 18, wherein at least one projected portion for facing said disc substrate is formed on the surface of at least one annular spacer, said bonding material layer is formed on the surface of at said annular spacer.

23. The optical recording disc as defined in claim 21, wherein the surface of said projected portion for facing said disc substrate is made a rough surface, a through path is formed to extend from the end portion of the projected portion for facing said disc substrate to the inner or outer surface of said disc substrate, and said through path can act as said ventilation path.

24. The optical recording disc as defined in claim 22, wherein the surface of said projected portion for facing said disc substrate is made a rough surface, a through path is formed to extend from the end portion of the projected portion for facing said disc substrate to the inner or outer surface of said annular spacer, and said through path can act as said ventilation path.

25. An optical recording disc comprising two disc substrates, each in a cylindrical shape having a round center hole, at least one recording layer formed on the surface of at least one of said two disc substrates, and bonding means made of a substantially different material from the material of said disc substrates for bonding said two disc substrates and keeping a space therebetween, said bonding means being formed on at least an inner rim portion or an outer rim portion of the surface of said disc substrates where said recording layer is formed, in such a manner that said bonding means is discontinued to provide at least one ventilation path for allowing to pass air between the air gap and outside of the optical recording disc.

26. The optical recording disc as defined in claim 25, wherein the surface of said substrate bonded to said bonding means is made with a rough surface.

27. The optical recording disc as defined in claim 25, further comprising at least one annular spacer mounted on either the inner rim portion or the outer rim portion of the surface of said disc substrate with a rough surface formed on said annular spacer, said bonding means being formed on the rough surface of said annular spacer.

28. The optical recording disc as defined in claim 25, wherein said respective disc substrate comprising an inner projected portion in a cylindrical shape formed at the inner rim portion of the surface of said disc substrate, an outer projected portion in a cylindrical shape formed at the outer rim portion of the surface of said disc substrate, the surface of the inner projected portion and the outer projected portion of at least one said disc substrate are made a rough surface, and said bonding means is formed on said rough surface.

29. The optical recording disc as defined any one of claims 26 to 28, wherein the interval between the top points of said rough surface, corresponding to the roughness of the rough surface, is in the range of 0.5–3 $\mu$m.

30. The optical recording disc as defined in claim 25, wherein at least one projected portion for facing said disc substrate is formed on at least one portion of the inner rim portion and the outer rim portion of at least one side surface of said disc substrate, said bonding means is formed on at least one portion of the inner rim portion and the outer rim portion of the surface of said disc substrate except said portion where the projected portion for facing said disc substrate is formed, said two disc substrates are bonded together, and said projected portion for facing said disc substrate can act as said ventilation path.

31. The optical recording disc as defined in claim 27, wherein at least one projected portion for facing said disc substrate is formed on the surface of at least one annular spacer, said bonding means is formed on the surface of at said annular spacer.

32. The optical recording disc as defined in claim 31, wherein the surface of said projected portion for facing said disc substrate is made a rough surface, a through path is formed to extend from the end portion of the projected portion for facing said disc substrate to the inner or outer surface of said disc substrate, and said through path can at as said ventilation path.

33. The optical recording disc as defined in claim 31, wherein the surface of said projected portion for facing said disc substrate is made a rough surface, a through path is formed to extend from the end portion of the projected portion for facing said disc substrate to the inner or outer surface of said annular spacer, and said through path can act as said ventilation path.

* * * * *

UNITED STATES PATENT AND TRADEMARK OFFICE
CERTIFICATE OF CORRECTION

PATENT NO. : 4,720,826

DATED : January 19, 1988

INVENTOR(S) : Toshinori SUGIYAMA et al

It is certified that error appears in the above-identified patent and that said Letters Patent is hereby corrected as shown below:

On the front page of the patent, Column 1, immediately under the last listed Foreign Application Priority Data of item [30] insert:

--February 4, 1986 [JP] Japan .... 61-21195--.

Signed and Sealed this

Seventh Day of June, 1988

*Attest:*

DONALD J. QUIGG

*Attesting Officer*      *Commissioner of Patents and Trademarks*